Figure 1:
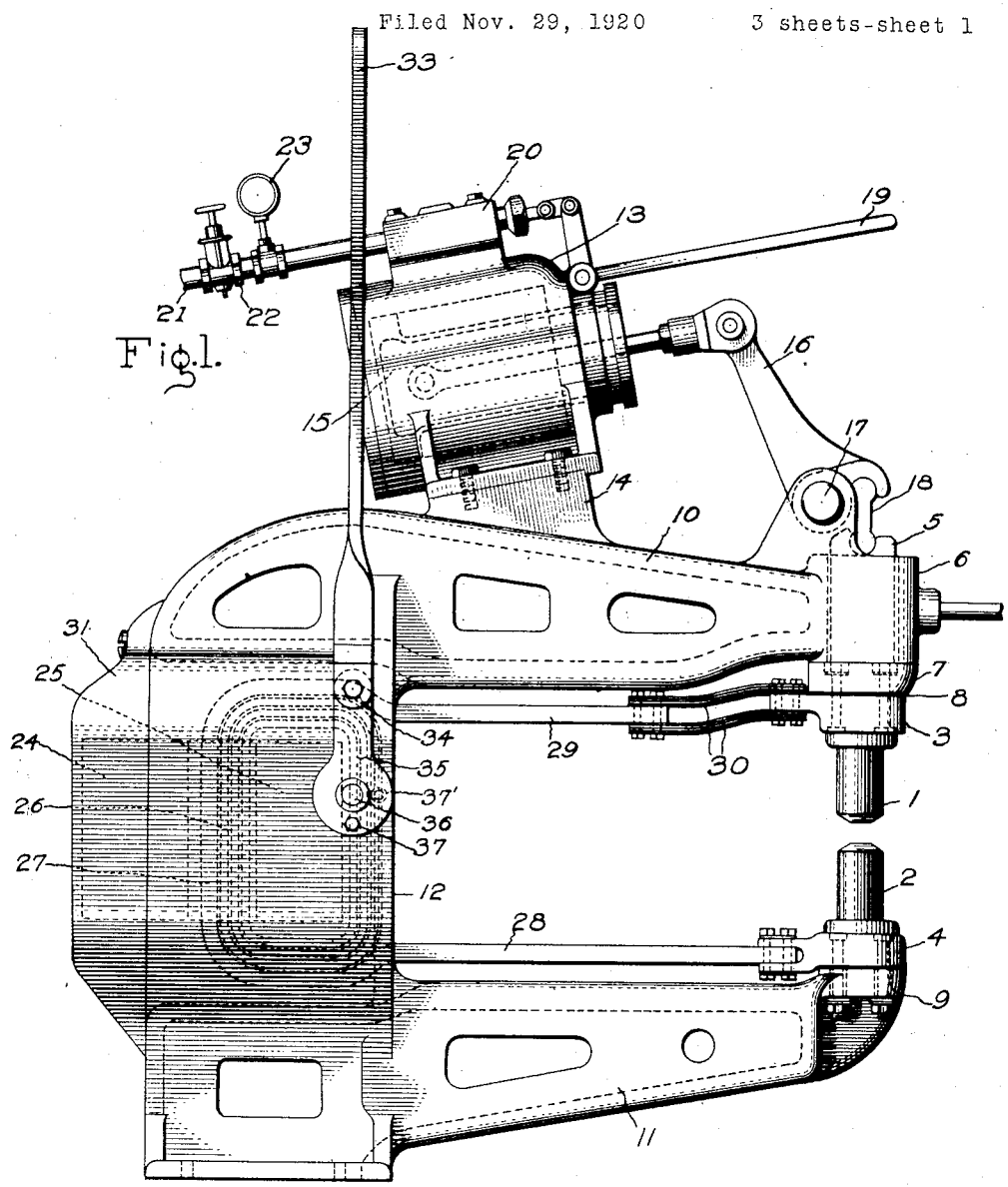

Mar. 20, 1923.

J. M. WEED 1,449,206

METHOD OF AND APPARATUS FOR HEAVY SPOT WELDING

Filed Nov. 29, 1920 3 sheets-sheet 1

Inventor:
James M. Weed,
by His Attorney.

Mar. 20, 1923.
J. M. WEED
1,449,206
METHOD OF AND APPARATUS FOR HEAVY SPOT WELDING
Filed Nov. 29, 1920 — 3 sheets-sheet 2
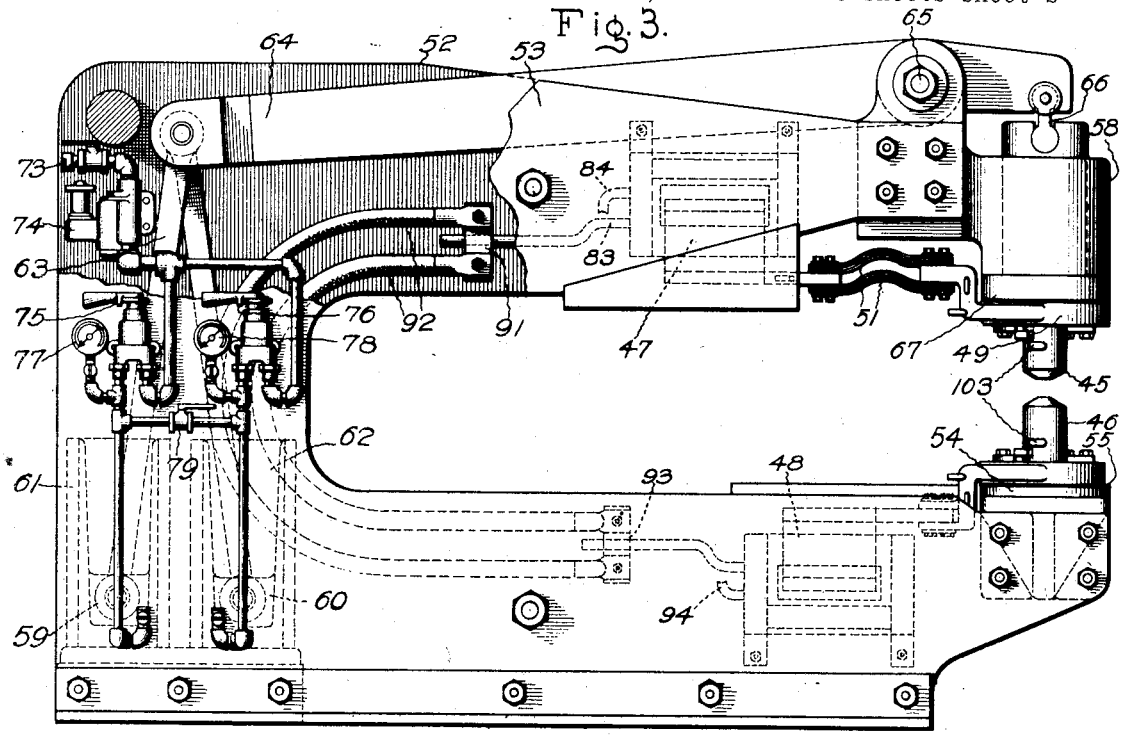
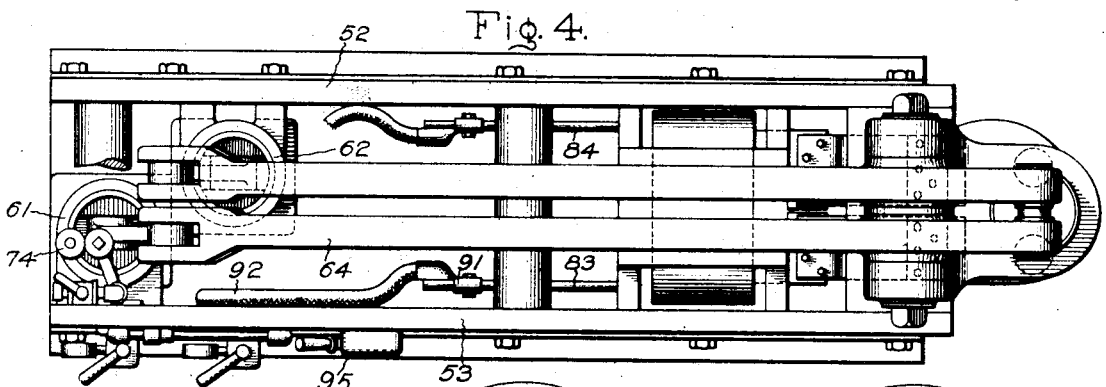
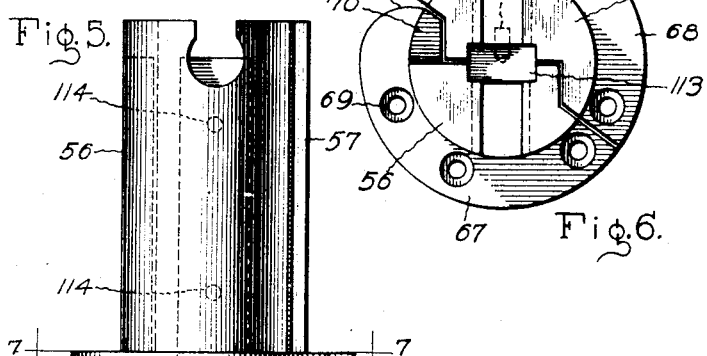
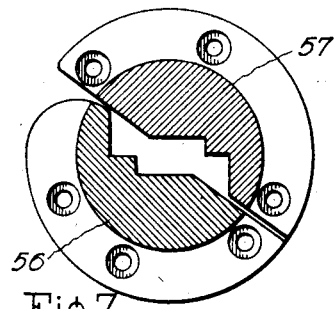
Inventor:
James M. Weed,
by *Albert G. Davis*
His Attorney.

Mar. 20, 1923.  1,449,206
J. M. WEED
METHOD OF AND APPARATUS FOR HEAVY SPOT WELDING
Filed Nov. 29, 1920  3 sheets-sheet 3.
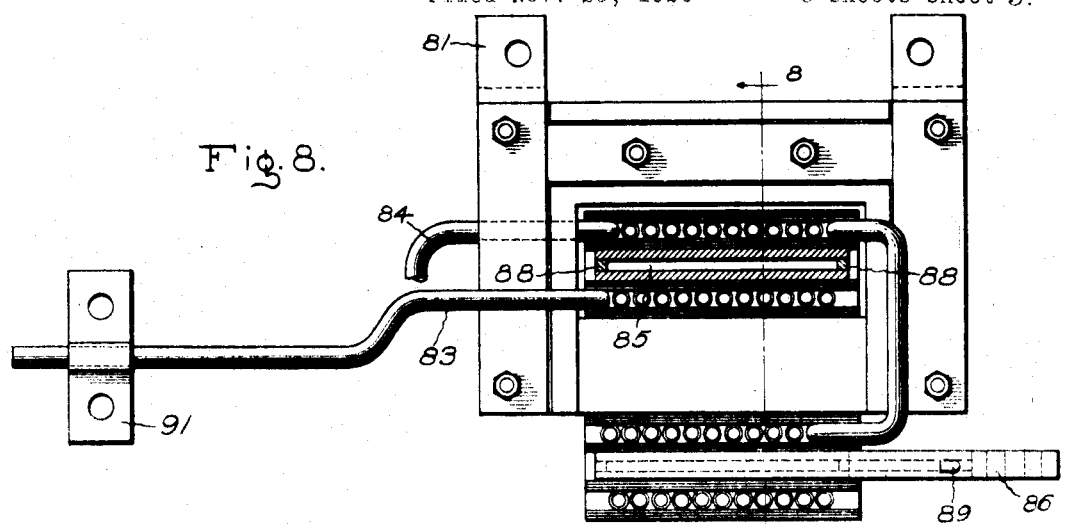
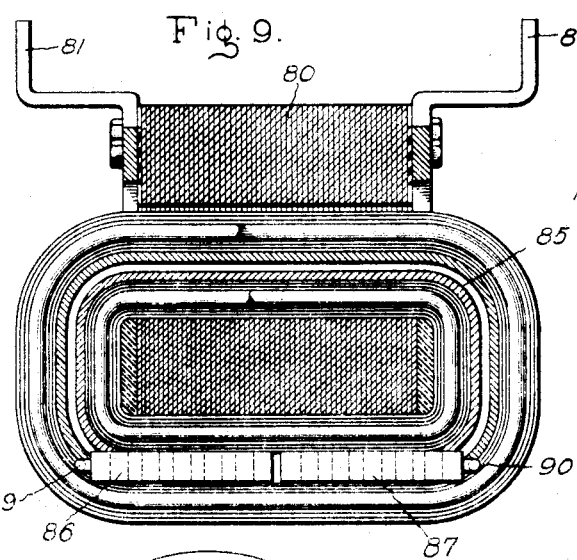
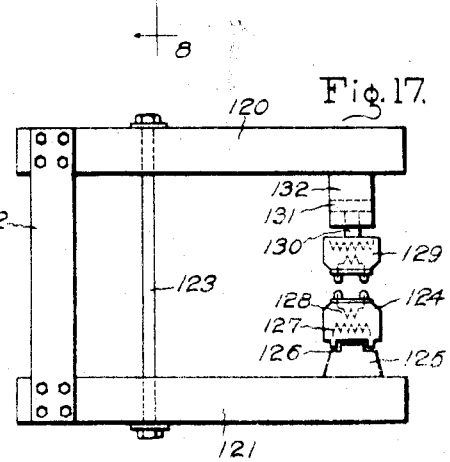
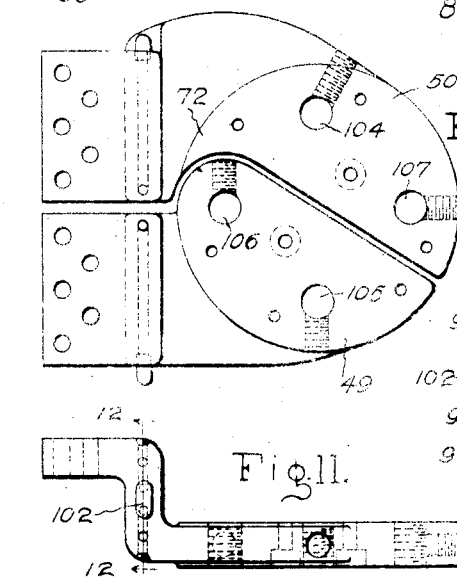
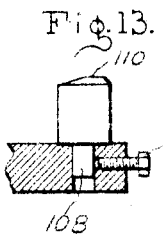
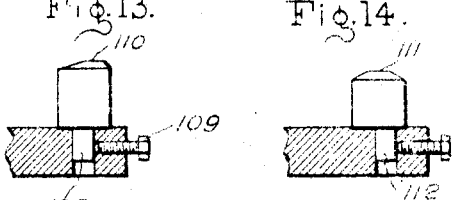
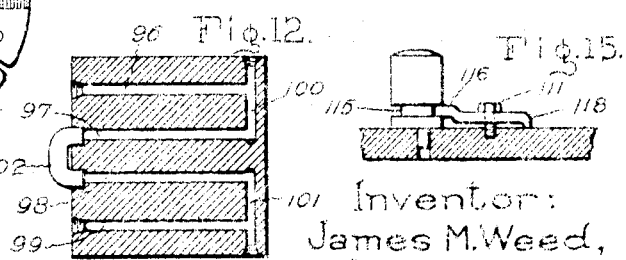
Inventor:
James M. Weed,
by Albert G. Davis
His Attorney Patented Mar. 20, 1923.

1,449,206

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

METHOD OF AND APPARATUS FOR HEAVY SPOT WELDING.

Application filed November 29, 1920. Serial No. 427,043.

*To all whom it may concern:*

Be it known that I, JAMES M. WEED, a citizen of the United States, residing at Schenectady, county of Schenectady, State of New York, have invented certain new and useful Improvements in Methods of and Apparatus for Heavy Spot Welding, of which the following is a specification.

My invention relates to electric welding and more particularly to a method and apparatus for spot welding heavy plates and structural parts. An object of my invention is to provide a method of spot welding which shall enable the limits of such welding to be extended far beyond anything heretofore thought possible of accomplishment. A further object of my invention is to provide an apparatus which shall be rugged, compact, simple to operate, readily adjustable, and ample in capacity to make possible the substitution of electric welding for riveting on parts of ships and the like composed of large sized plates and structural parts which may be fabricated before they are assembled in place.

My invention will be better understood from the following description taken in connection with the accompanying drawings, and its scope will be pointed out in the appended claims.

In spot welding, the plates or structural parts to be welded together, are compressed between electrodes of comparatively small contact area and a current of electricity is passed through the electrodes. This current flowing through the resistance of the plates brings them to a welding temperature and the pressure upon the electrodes causes welding to take place over a small area or spot, the size of which varies with the size of the electrodes and the length of time the current is allowed to flow.

Prior to my invention the field of spot welding had been limited to plates not exceeding ⅜ in. in thickness, in fact, in practical operation, the welding of plates, as distinguished from narrow strips or small pieces, was confined to thicknesses of about ³⁄₁₆ in., giving a total thickness of metal of about ⅜ in. Plates of greater thickness were welded, if at all, only with great difficulty and uncertainty. According to my invention, however, it is possible to weld plates of much greater thickness and I have found no more difficulty in spot welding large ¾ in. plates than was previously experienced in welding ³⁄₁₆ in. plates, in fact, by my invention the size and thickness of plates that may be welded is limited only by the capacity of the machine.

For spot welding together heavy plates or structural parts, I have found it necessary to exert sufficient pressure on the work at the spot where the weld is to occur to spring the cold plates sufficiently to overcome any inequalities of the surface and make intimate contact between the surfaces to be welded. For steel plates these pressures will vary with the thickness of the plates reaching approximately thirty thousand pounds per square inch for plates one inch in thickness. These large pressures make it imperative that the tips of the electrodes, through which the pressure is applied and through which the current flows, be very large in comparison with the electrode tips which may be used for thin plates for the reason that copper, which by reason of its low resistance and good heat conductivity, is practically the only material suitable for electrodes, has a relatively low compressive strength. Very heavy currents are required to produce the welding temperature, not only because of the increased thermal capacity of the work on account of its thickness but also on account of the large area of the spot or path through which current flows. The very high current density at the point of contact of the electrode and the work magnifies the difficulty of keeping the electrode sufficiently cool to prevent softening and deformation. I have found it impossible to water-cool the electrode sufficiently to give reasonable life if the section of the electrode is carried up any distance from the work with the same cross-section as the area of the electrode tip. However, by making the shape of the electrode tip that of a flat truncated cone, I have found it possible to obtain a sufficiently heavy mass of copper in the immediate vicinity of the point of contact to furnish sufficient thermal capacity to absorb the heat developed during the time of welding and keep the electrode at a safe temperature. With this construction the tip of the electrode is strongly reinforced against deformation and a large cooling surface is afforded in the base of the electrode through which cooling water may be circulated during the time of welding and during the intervals between welds to provide ample cooling effect. The currents necessary are so great, however, that I have found it essential that the surfaces of the work in contact with the electrode tips be as clean as possible, to reduce the contact resistance and consequent heating to a practical value. The rust or scale should be removed from the plates where they are to be engaged by the electrodes by grinding, sand-blasting, or some other equivalent method. Since the areas to be cleaned are small, this local cleaning may be very simply and quickly done. I have found moreover that practical heavy spot welding of flat surfaces is conditioned upon the existence of a coating of rust or scale or other equivalent resistance material, on the surfaces between which the weld is to be effected. The rate of heating at the surfaces to be welded depends largely upon the contact resistance, and consequently upon the condition of the plates and the pressure used. If the plates are clean and bright, and the pressure high, the rate of heating with a given amount of current is slow and the welding efficiency poor. This makes it difficult to weld heavy plates if they are clean, since, as heretofore set forth, it is necessary to use great pressure with heavy plates to insure a better contact of the areas to be welded than that of surrounding areas. I have discovered that it is much easier to weld plates which carry the original coat of mill scale, or a coating of rust, affording a considerable resistance. If this resistance is too great, the necessary current will not flow, of course, but if the scale is not too heavy it has little effect upon the current, the high reactance of the welding circuit giving it practically a constant current characteristic and making the rate of heating proportional to the resistance within certain limits. While a fairly thin uniform coating of the pure hydrated oxide of iron would act almost as an insulator, there is practically always present enough conducting oxide or a sufficient number of unoxidized particles of metal to permit, with the high pressures used, an initial flow of heating current. The hydrated oxide present when heated in contact with metallic iron is quickly converted into the conducting black oxide. The scale has a higher specific resistance than the metal of the plates and due to this fact the delivery of energy is concentrated in the layer of scale, thereby quickly raising its temperature and by consequence the temperature of the metal strictly adjacent and in contact therewith. When the scale reaches its fusion point the surfaces of the plates to be welded will be in a state of plasticity. The approach of the plates under pressure squeezes or drives out the melted scale and brings the clean plastic surfaces into contact and they will unite with a sound weld. The high resistance coating upon the plates has a further beneficial effect in that it tends to insulate the surfaces of the plates adjacent the spot being welded thereby confining the current and heating to the desired point.

When the welding current has been maintained for a time sufficient to bring the plates to the proper condition for welding, the flow of welding current should be interrupted, but full pressure should be maintained upon the electrodes for a short interval after this interruption of the welding current. At the moment of interruption of the current the metal of the plates is in a tacky or plastic condition, and it is essential that the pressure be maintained for an interval sufficient to compensate for shrinkage of the metal in cooling and to allow the weld to acquire sufficient strength to withstand any tendency of the plates to spring apart. Maintaining the pressure for this interval also prevents the formation of gas pockets in the hot plastic material.

If it is desired to weld parts which are clean and bright, a suitable resistance coating should be provided at and near the points where welding is to take place. This coating may be provided by producing a coating of oxide on the plates or by sprinkling or painting on a suitable material.

I have found it desirable to use currents in the neighborhood of 30,000 amperes for welding ¼ in. steel plates, and spots varying in diameter from ¾ in. to 1¼ in. may be produced in from 5 to 15 seconds. Thicker plates require more time and thinner plates less time. For plates ½ in. thick I prefer to use currents of from 40,000 to 50,000 amperes. Within the limits of current and pressure I have pointed out, I have found that there is a considerable range in pressure, current, and time which will make successful welds. With the current and pressure approximately correct at the time of starting, there is no necessity for changing the current and pressure during the welding operation.

Figure 2:
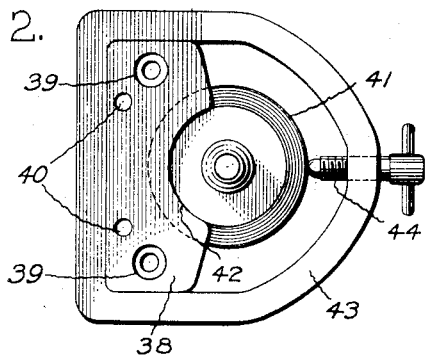
Figure 16:
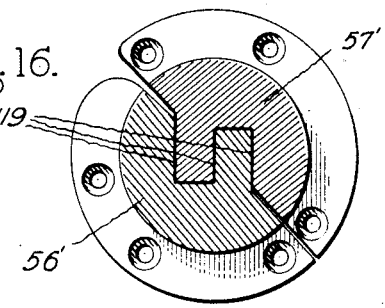

Referring to the accompanying drawings, Fig. 1 is a side elevation of a portable spot welding machine for making a single weld at a time; Fig. 2 is a plan view of an electrode securing arrangement; Fig. 3 is a side elevation, certain parts being broken away, of a spot welding machine for large and heavy plates or structural parts arranged to make two welds simultaneously; Fig. 4 is a plan view of the machine shown in Fig. 3; Fig. 5 is a side elevation of the divided plunger for supporting and operating the electrodes; Fig. 6 is a plan view of the divided plunger shown in Fig. 5; Fig. 7 is a section taken on the line 7—7 of Fig. 5 looking in the direction of the arrows; Fig. 8 is a side view of one of the transformers used in the machine shown in Fig. 3, certain parts being shown in section; Fig. 9 is a section taken on the line 8—8 of Fig. 8; Fig. 10 is a plan view of the electrode supporting bases for carrying the upper electrodes of the machine shown in Fig. 3; Fig. 11 is a side elevation of the electrode supporting bases shown in Fig. 10; Fig. 12 is a section on line 12—12 of Fig. 11; Fig. 13 is a detail view showing a method of mounting a welding electrode having an eccentric tip or welding face; Fig. 14 is a detail view of a modified arrangement for mounting an electrode; Fig. 15 shows a modified arrangement for securing an electrode in place; Fig. 16 shows a modified construction of divided plunger, and Fig. 17 is a side elevation of a modified form of welding machine.

Referring to Fig. 1, a machine for making a single spot weld at a time is shown. This machine comprises electrodes 1 and 2 mounted respectively on electrode supporting bases 3 and 4. The electrode 1 is mounted upon a plunger 5 movable in the head 6. The lower portion of the plunger 5 is enlarged, as shown at 7, and the electrode supporting base 3 is bolted to the portion 7 of the plunger, the bolts being suitably insulated and a layer of insulation 8 being used between the base 3 and support 7. The lower electrode supporting base 4 is secured in a similar manner to the fixed portion 9 of the frame. The frame of the machine comprises a pair of arms 10 and 11 projecting from a body portion 12 constructed with an internal space for mounting a transformer for supplying welding current to the electrodes. In order to reduce reactance the frame is preferably made of gun-metal or other non-magnetic material having sufficient strength to withstand the strains due to the great pressures used for welding. In order to operate the movable electrode 1 a fluid pressure operating means is provided, which is shown as a cylinder 13 mounted upon a projection 14 from the frame member 10. Motion is transmitted from the piston 15 of the fluid pressure cylinder to the bell crank 16 pivoted at 17. Bell crank 16 is connected to the plunger 5 by means of the link 18, which is provided with enlarged heads which are arranged to be slipped sidewise into suitably shaped openings in the bell crank 16 and plunger 5. As thus arranged the link 18 enables the plunger 5 to be raised and lowered. This arrangement also enables the plunger 5 to be located very close to the pivot 17 giving the necessary ratio of lever arms of the bell crank 16 to secure the desired multiplication of pressure with minimum length of the bell crank. The action of the plunger 5 may be controlled by the lever 19 which operates a pilot valve 20 for admitting fluid pressure to one side or the other of the piston 15. Fluid pressure is supplied from any suitable source to the pipe 21 and a reducing valve 22 is provided for adjusting the maximum pressure that may be applied by the control lever 19 to any predetermined desired amount. A gauge 23 is provided to indicate to the operator of the machine the pressure available at the electrodes.

The transformer mounted in the body of the frame may be of any suitable construction. I have shown this transformer in dotted lines as comprising a core member having legs 24 and 25 with primary and secondary windings arranged upon the leg 25. The primary winding 26 is indicated as a three-layer winding. This winding will preferably be constructed of copper tubing in order to permit the circulation of cooling water. A single turn U-shaped secondary winding 27 surrounds the primary winding. This winding 27 is preferably made hollow in order to permit the circulation of cooling water. The construction and arrangement of this type of transformer winding is fully explained hereinafter in connection with the description of Figs. 8 and 9. The long end 28 of the U-shaped secondary 27 runs out along the arm 11 of the frame and is bolted directly to the copper base 4 upon which the electrode 2 is mounted. The short end 29 of the secondary connects to the base 3 of the electrode 1 through flexible leads of laminated copper 30 to permit of the necessary motion of the electrode 1 for engaging the work. In order to provide access to the chamber in the body of the machine for installing or repairing the transformer an opening is provided which may be closed by a cover plate 31 suitably secured to the frame. Suitable connecting hose will be provided for leading cooling water to the primary and secondary windings and to the electrodes and electrode supporting bases.

In order to make the machine portable, a bail 33 is provided which enables the machine to be carried by a crane or similar apparatus. The bail 33 is pivoted on each side of the machine at 34 to a member 35. Member 35 is pivoted at 36 and secured to the frame of the machine by a bolt 37. As illustrated, the machine is arranged with the arms of the frame horizontal. If it be desired to support the machine with the arms 10 and 11 vertically arranged, this may be done by loosening the bolt 37 and turning the frame until the bolt 37 can be inserted into the opening 37'. As thus arranged the machine may be supported by the bail 33 in different angular positions in a vertical plane.

The electrodes 1 and 2 may be secured to the electrode supporting bases by means of a stud secured to the electrode and held in the supporting base by means of a set screw, as fully described hereinafter in connection with Fig. 13. A modified arrangement for securing the electrode to the supporting base is shown in Fig. 2. In this arrangement an under-cut member 38 is arranged to be secured to the electrode supporting base by bolts placed in openings 39 and dowel pins inserted in openings 40, or in any other suitable way. The electrode 41 is slid laterally into engagement with the member 38 with curved portion 42 of the member 38 partially surrounding the body of the electrode. A clevis 43 is placed over the member 38 and a set screw 44 threaded through an opening in the clevis 43 is turned to clamp the electrode 41 firmly in place. With this arrangement the electrode may be made flat on the bottom, no projecting stud being required.

While my method of operation is in no way limited to any particular construction of machine so far as the method of spot welding heavy plates is concerned, it is very desirable in machines having a long reach to eliminate the reactance of the circuit as far as possible. The machine shown in Figs. 3 and 4 comprises a pair of upper movable electrodes 45, which are shown as located side by side arranged to cooperate with a pair of lower fixed electrodes 46, current being supplied to the electrodes in series from transformers 47 and 48 in a manner well known in the art and shown, for example, in the patent to Gravell No. 1,041,778 patented October 22, 1912. By using two transformers in series as integral parts of the machine and two pairs of electrodes, a great reduction in the kv-a. capacity required for welding is secured and at the same time a doubling of the work done is obtained, since two spots may be welded at the same time. The transformers are mounted in the frame of the machine, in a manner hereinafter described, on opposite sides of the work and as near to the welding electrodes as possible so as to obtain minimum reactance in the welding circuit. The polarity of the electrodes on one side of the work is the reverse of that of the opposite electrodes, thus giving a series arrangement of the transformer secondaries, the same current flowing through the secondaries of both transformers and through both of the spots to be welded. The copper bases 49 and 50 (see Fig. 10) which carry the upper electrodes are connected to the terminals of the secondary winding of transformer 47 through copper leads 51 which are laminated to give flexibility for the motion of the upper electrodes necessary for engaging the work. The stationary lower electrodes are mounted on similar copper bases which are rigidly connected to the terminals of the secondary winding of the transformer 48. The frame of the machine is constructed of the two steel side plates 52 and 53, the use of steel being easily permissible in this case on account of the restricted area of the welding circuit and its relative position resulting in small tendency for magnetic flux to enter the frame. The lower fixed electrode bases are mounted on a yoke 54 bolted to the side plates 52 and 53. These bases are insulated from the yoke 54 by a layer of mica 55, the bolts which hold the bases in place being also insulated by mica. The copper bases 49 and 50 which support the upper electrodes 45 are mounted upon the respective divisions 56 and 57 of a divided plunger (see Figs. 5, 6 and 7) mounted in the welding head 58 which is bolted to the side frame members 52 and 53. The plungers 56 and 57, the head 58 and the yoke 54 being in close proximity to the welding circuit are preferably made of non-magnetic material, such as gun-metal. The plunger divisions 56 and 57 are not insulated from each other, but the electrode supporting bases 49 and 50 are insulated from the plunger divisions, to which they are bolted, in the same manner that the copper bases supporting the lower electrodes are insulated from the yoke 54. In order successfully to weld two spots at the same time, it is necessary that the pressure shall be independently applied to the electrodes. Otherwise, due to inequalities of the thickness of the work, or in the wear and tear of the electrodes, the pressure may be much greater on one of the spots than on the other. This results in unequal heating in the two spots, the resistance and its heating effect being less in the spot with the greater pressure. The two electrodes of this machine are, therefore, mounted on separate plungers operated by separate pistons 59 and 60 respectively in air cylinders 61 and 62 which are mounted on a cast iron bed plate on the back side of the machine. Piston 59 transmits motion to the plunger division 56 by means of a link 63 and lever 64 pivoted on the frame of the machine by the shaft 65. Lever 64 is connected to plunger division 56 by means of a link 66 arranged so that the lever can lift the electrode from the work when the weld is completed as well as press it down upon the work for making the weld. A similar link and lever arrangement connects the piston 60 to the plunger division 57. This arrangement of the parts enables the apparatus to be constructed in a very compact manner and makes it possible to locate the welding head 58 very close to the pivot 65, thereby making it possible to obtain the leverage necessary for producing the enormous pressures which are essential for proper welding. The lifting of the electrodes 45 may be accomplished by gravity, the weight of the long ends of the levers 64 being sufficient for this purpose. Air pressure is here used only to force the electrodes down upon the work.

The electrode supporting bases which are connected to the transformer terminals must be large in order to have the thermal capacity necessary to conduct heat away from the electrodes with sufficient rapidity. To support these bases throughout the area over which pressure is applied and to furnish a convenient means for securing the electrode bases to the plunger divisions, flanges 67 and 68 are provided on the plunger divisions, these flanges being provided with countersunk openings 69 to receive the heads of the bolts which secure the electrode supporting bases in place. In order to permit the plunger division 56 to be raised when the plunger division 57 is lowered, the top corner of the plunger division is cut away as shown at 70. In order to permit the electrode supporting base 50 to move independently of the supporting base 49, the corner of the flange 67 is cut away, as shown at 71, Fig. 6, to clear curved portion 72 of the base 50 shown in Fig. 10.

The air pressure for operating the pistons 59 and 60 is supplied at 73 and passes through a reducing valve 74 which may be set to hold the available supply pressure at any predetermined maximum value. The air after leaving reducing valve 74 passes through manually operated valves 75 and 76 to the respective air cylinders 61 and 62, gauges 77 and 78 being provided to indicate the pressures that are being applied to the electrodes. These pressures may be controlled independently, if desired, by means of the valves 75 and 76, at any desired values within the predetermined maximum. If only one weld is desired the other pair of electrodes may be brought into contact with each other, thus closing the circuit. If the work interferes with bringing the electrodes together a weld may nevertheless be prevented at this point by using large copper pieces under the electrodes or by using electrodes having extra large contact surfaces, to distribute the current over an area sufficiently large to reduce the heating to a low value. A bypass valve 79 is provided for connecting the cylinders 61 and 62 together when desired. When this bypass valve 79 is closed, the pressure applied to the electrodes may be independently controlled as above set forth. When the bypass valve 79 is open, the pressure upon the electrodes is equalized and this pressure may be controlled from either valve 75 or valve 76, as desired.

The construction of the transformers 47 and 48 is shown in Figs. 8 and 9. These transformers are provided with a core 80 composed of laminations bolted together in the usual manner and supported between the frame plates 52 and 53 by the bars 81 and 82. Windings are applied to but one leg of this core and the conductor for the primary winding is copper tubing which permits of the circulation of cooling water therethrough, which cooling is necessary by reason of the high current densities required because of the small dimensions of the transformers due to the limited space available. The terminals of the primary winding are shown at 83 and 84. The secondary winding 85 is interlaced with the primary winding to obtain minimum reactance. The secondary winding 85 is a single turn winding provided with terminals 86 and 87 from which current is conducted to the welding electrodes. This winding is shown as constructed of two copper plates bent to the proper shape and assembled one inside the other with a small space between them. Narrow strips of copper 88 are inserted between the plates along the edges and the plates are brazed to these strips, thus making a watertight chamber or passage for the circulation of cooling water. Nipples 89 and 90 are provided for making hose connections to the source of cooling water. In case the machine is started up without the cooling water having been turned on, the temperature rise in these windings will be rapid, and in order to avoid danger of burning the insulation; asbestos and mica are preferably used. The copper tube may be taped with asbestos tape and alternative layers of sheet asbestos and mica may be used between the windings and core. The complete transformer after assembling is preferably impregnated with bakelite. The result is a solid mechanical unit which will not be injured by temperatures not exceeding 150° C. As thus arranged several welds can be made without turning on the cooling water before this temperature will be reached. The resistance of ordinary hydrant water is sufficiently great as to cause no concern regarding the grounding or short circuiting of the windings through the cooling water, although it is necessary to use rubber tubing or hose for leading it in and out. The transformer primaries are preferably connected in series, the current passing from the control panel to the terminal 84 of the upper transformer and then passing out through the terminal 83 to the connecting member 91, passing thence through the flexible leads 92 to the terminal connecting member 93 of the lower transformer, the current after traversing the primary winding of the lower transformer passing out through the terminal 94 to the control panel. A switch 95 (see Fig. 4) is preferably mounted on the frame of the machine for controlling the contactors for closing the welding circuit, which contactors are mounted on the control panel.

In order to conduct the heat away from the electrode bases with sufficient rapidity, it is necessary to resort to water cooling for these parts also. In order to accomplish this, passages 96, 97, 98 and 99 are drilled as shown in Fig. 12 and cross bores 100 and 101, which are subsequently closed by plugs, are provided to interconnect passages 96 and 97 and passages 98 and 99 respectively. A connection 102 is provided to connect passages 97 and 98 so that cooling water may be passed into passage 99 and out of passage 96.

In addition to water cooling the electrode bases, it is also necessary to water cool the electrodes themselves in order to keep the electrodes at sufficiently low temperature for satisfactory operation. The electrodes are, therefore, provided with passages for circulating cooling water therethrough in a manner shown, for example, in my Patent No. 1,330,563, patented February 10, 1920. Nipples for making the hose connections to the electrodes as shown in Fig. 3 at 103.

With the electrodes arranged as shown in Figs. 3 and 4, it will be observed that the welds are spaced in a direction at right angles to the axis of the machine. It is frequently necessary to change the angular relation of the welds in the plate. To make it unnecessary to change the angle at which the work is presented to the machine, I have made provision for shifting the electrodes on their bases to positions 90° from those shown in the drawing, thus spacing the welds in a direction along the axis of the machine instead of transverse to it. In order to accomplish this result, I provide a plurality of openings or sockets in the electrode supporting bases and removably mount the electrodes in these sockets so that they may be placed in the desired positions to secure the desired angular relation of the welds. As shown in Fig. 10, four sockets are provided. Sockets 104 and 105 are arranged in a line transverse to the axis of the machine, while sockets 106 and 107 are arranged along the axis of the machine. Each electrode, as shown more clearly in Fig. 13, is provided with a projection 108 for entering the socket in the electrode supporting base and the electrode is clamped in place by a set screw 109. Access may be secured to the set screw for socket 106 when the base 50 is raised and the base 49 lowered. This set screw cannot project beyond the edge of the base 49 and it will therefore be provided with a slot in the end thereof for engagement by a screw driver or similar tool.

In order to enable the distance between the welds to be adjusted, I provide means for varying the distance between the electrode tips. As shown in Fig. 13, the projection 108, which secures the electrode in the socket in the electrode supporting base, is arranged concentrically with the body of the electrode but the electrode tip or welding face 110 is eccentrically located with respect to the body of the electrode. In order to adjust the distance between the welds, it is merely necessary to loosen the set screws 109 and turn the electrodes in their supporting sockets. Fig. 14 shows a modified construction for adjusting the distance between welds. In this modification the welding tip 111 of the electrode is located concentrically with the body of the electrode, but the projection 112 for securing the electrode in the supporting base is located eccentrically with respect to the axis of the electrode. If electrodes having eccentric tips, as well as eccentrically located securing projections, are used, a still greater range of adjustability for the distance between the welds may be secured.

It will be apparent that with the electrodes located in the sockets 104 and 105, the pressure exerted upon the plunger divisions will be directly over the electrodes so that there will be little tendency to cause binding of the plunger divisions in the welding head 58. When, however, the electrodes are located in the sockets 106 and 107, it is apparent that there is a tendency for the plunger divisions to cant, and provision must be made to prevent binding of the plunger divisions in the welding head. To prevent this binding, I have shown a guiding means or key 113 (see Fig. 6) between the plunger divisions and have divided the plunger so that bearing surfaces on each plunger division engage the parallel sides of this key. The member 113 will preferably be secured to one of the plunger divisions and in Figs. 5 and 6 dowel pins 114 are shown for causing the member 113 to move with the plunger division 57. The member 113 will preferably be made of different material than the plunger divisions in order to reduce the friction of the bearing surfaces.

Fig. 15 shows a modified arrangement for securing the electrodes in place which makes it unnecessary to use the set screws 109. In this arrangement the electrode is provided with a groove 115 arranged to be engaged by a bar 116 adapted to be held by the cap screw 117 to clamp the electrode firmly to the base. A heel 118 on the bar 116 acts as a fulcrum for the bar. By locating the cap screw in proper relation to the sockets in the electrode supporting base, the bar may be turned to engage and secure the electrode in either socket.

Fig. 16 shows a modified construction of the plunger divisions which may be used instead of the arrangement shown in Fig. 6. In this modified construction the plunger divisions 56' and 57' are constructed so as to provide a plurality of engaging surfaces 119 which prevent any canting action of the plunger divisions in the plane of the axis of the machine.

While I have shown the machine with its jaws arranged horizontally, it will in many cases be preferable to use a vertical arrangement. Where very large plates or structural parts are to be fabricated the handling of the material by cranes or equivalent apparatus is facilitated by the vertical arrangement.

Fig. 17 diagrammatically represents a modified construction of welding machine providing means for varying the angular position of the welds in the articles to be welded. In this figure the frame of the machine is represented as an I-beam or channel iron structure having upper and lower members 120 and 121 secured together by suitable frame members and bolts 122 and 123. The transformers in this case are rotatably mounted, the lower transformer 124 being mounted upon the base 125 by the bearing 126 which permits the transformer to be turned with respect to the base. The transformer is provided with a primary winding 127 and secondary winding 128 which is connected to the lower electrodes which are secured to electrode supporting bases directly mounted on the transformer. The upper transformer 129 is provided with similar primary and secondary windings connected to electrodes similarly mounted. The upper transformer is mounted on a plunger 130 connected to a piston 131 operating in the hydraulic cylinder 132 secured to the upper frame member 120 of the machine. The upper transformer is thus rotatable with the piston in the cylinder. The upper movable electrodes are moved with the transformer 129 to and from the lower electrodes. Hydraulic pressure is preferably used in this case instead of air pressure for the reason that greater supply pressures are required by reason of the absence of a lever mechanism for multiplying the pressure. The hydraulic cylinder is made double-acting in a manner well known in the art, the force required to lift the piston, of course, being very small in comparison with the force necessary to press the electrodes together.

While I have shown no means for adjusting the welding transformers to give different values of welding current, it is to be understood that any suitable means of that character will be provided. Such means may conveniently take the form of a regulating transformer arranged to adjust the voltage applied to the primary windings of the welding transformers.

In order that the welding transformers may be operated from any ordinary power circuit, it will be desirable to use a motor generator set having a suitable fly wheel. This will avoid trouble from low power factor and will distribute the load over the phases of a polyphase supply circuit. Moreover, such an arrangement will distribute the energy drawn from the power circuit for each weld over a considerable interval of time thus substituting small and gradual changes in power for large and sudden changes. On account of the reactance, the welding current will remain practically constant as the speed and frequency of the motor generator set decreases, thus favoring the utilization of the energy of the fly wheel. When such a motor generator set is used a regulating transformer is not required, since the voltage impressed upon the welding transformer may be controlled by adjusting the generator field strength.

What I claim as new and desire to secure by Letters Patent of the United States, is:—

1. The method of spot welding plates or structural parts by compressing the plates between electrodes through which a welding current is passed, characterized by the fact that the surfaces to be welded are provided with a coating adapted to furnish a relatively high contact resistance between the plates and by the fact that the surfaces of the plates where they are engaged by the welding electrodes are made to furnish a relatively low contact resistance.

2. The method of spot welding heavy steel plates or structural parts which comprises, providing the plates with clean contact surfaces where they are to be engaged by the welding electrodes, compressing said plates between electrodes with a pressure sufficient to overcome inequalities of the surfaces to be welded while maintaining on the surfaces to be welded a coating adapted to provide a resistance substantially equal to that of a thin coating of rust or mill scale, passing a current through said electrodes of a value sufficient to bring the contact surfaces to a welding temperature, while maintaining full pressure on said electrodes, whereby the resistance coating is liquefied and forced out from between the surfaces to be welded and a firm weld produced between the clean plastic surfaces to be welded.

3. The method of spot welding heavy plates or structural parts which comprises, providing on the surface to be welded a thin coating of a material having a higher specific resistance than the plates to be welded and adapted to fuse when the surfaces to be welded reach a plastic condition suitable for welding, providing the plates with clean contact surfaces where they are to be engaged by the welding electrodes, compressing said plates between electrodes with a pressure sufficiently great to spring the cold plates to bring the areas to be welded into more intimate contact than the surrounding areas, and passing a current through said electrodes of a value sufficient to bring the contact surfaces to a welding temperature while maintaining full pressure on said electrodes, whereby the resistance coating is liquefied and forced out from between the surfaces to be welded and a firm weld produced between the clean plastic surfaces to be welded.

4. The method of spot welding heavy steel plates or structural parts having a coating of rust or mill scale which comprises, removing the rust or scale to provide clean contact surfaces where the plates are to be engaged by the welding electrodes, compressing the plates between the electrodes with a high pressure, and passing a current through said electrodes of a value sufficient to bring the contact surfaces to a welding temperature while maintaining full pressure on said electrodes, whereby the coating of rust or mill scale between the plates acts as a resistance to assist in bringing the plates quickly to a welding temperature and is melted and forced out from between the surfaces to be welded, and whereby the intimate contact between the electrodes and cleaned surfaces of the plates affords a good electrical connection between the electrodes and plates to reduce the amount of heat developed at these contact surfaces during the time of making a weld to an amount that may be conducted away from the contact surfaces of the electrodes without softening of these surfaces to an extent sufficient to produce material deformation.

5. The method of spot welding heavy steel plates or structural parts having a coating comprising black oxide of iron, which consists in removing the coating to provide clean contact surfaces where the plates are to be engaged by the welding electrodes, compressing the plates between the electrodes with a pressure sufficient to spring the cold plates, passing a current through said electrodes of a value sufficient to bring the surfaces to be welded to a plastic condition suitable for welding, interrupting the flow of current, and maintaining the full pressure upon the electrodes for a sufficient interval after the current ceases to flow to compensate for shrinkage of the metal in cooling and to allow the weld to acquire sufficient strength to withstand any tendency of the plates to spring apart.

6. The method of spot welding heavy plates or structural parts having a high resistance coating thereon which comprises pressing the plates together over an area approximately the size of the spot to be welded with a pressure sufficient to overcome inequalities of the surfaces to be welded while passing a welding current through the area to be welded of a value sufficient to bring the contact surfaces to a welding temperature, whereby the resistance coating tends to insulate the plates at points adjacent the spot to be welded thereby assisting in localizing the current to said spot and whereby the said coating acts to concentrate the delivery of energy to the coating thereby quickly raising its temperature to the fusion point, maintaining said pressure to drive out the liquefied resistance material, interrupting the flow of welding current, and maintaining the pressure for a sufficient interval after the welding current ceases to flow to compensate for shrinkage of the metal in cooling and to allow the weld to acquire sufficient strength to withstand any tendency of the plates to spring apart.

7. In a welding apparatus, the combination with a divided plunger, independently operable means for applying pressure to the separate plunger divisions, and electrode supporting blocks carried by the respective plunger divisions and means for insulating the electrode supporting blocks from the plunger divisions.

8. In a spot welding apparatus, the combination with a divided plunger, independently operable means for applying pressure to the separate plunger divisions, electrode supporting blocks carried by and insulated from the respective plunger divisions, a plurality of sockets in each block adapted to receive and hold welding electrodes, arranged so that with one electrode in each block the pair of electrodes may be located in a plurality of angular relations.

9. In a spot welding apparatus, a welding head having a bore therethrough, a divided plunger, mounted and guided in said bore, independently operable means for applying pressure to said plunger divisions, an electrode supporting block carried on each plunger division and means whereby an electrode may be mounted in a plurality of locations on each supporting block, and guiding means for the adjacent faces of said plunger divisions to prevent binding in said bore when an electrode is located at one side of the line of application of pressure to the plunger division.

10. In a spot welding machine the combination with a welding head, a support therefor, a plurality of electrodes mounted in said head, and means whereby the position of the electrodes may be changed with respect to the axis of the support whereby the angular position of the welds in the articles to be welded may be varied without varying the angle at which the articles to be welded are presented to the machine.

11. In a spot welding apparatus, a plurality of welding electrodes adapted to produce simultaneously a plurality of welds in spaced relation and means providing eccentric adjustment of the welding faces of said electrodes whereby the distance between welds may be varied.

12. In a spot welding apparatus, a plurality of welding electrodes adapted to produce simultaneously a plurality of welds in spaced relation and means providing eccentric adjustment of the welding face of one of said electrodes whereby the distance between welds may be varied.

13. An electric spot welding machine comprising electrodes arranged to make simultaneously a plurality of spot welds, fluid pressure means arranged to apply pressure independently to the electrodes at the respective welds, and a by-pass connection for equalizing the pressure supplied to the respective fluid pressure means.

14. An electric spot welding machine comprising electrodes arranged to make simultaneously a plurality of spot welds, means comprising a fluid pressure cylinder for applying pressure to the electrodes at each weld, a valve adapted to control the fluid supply to each cylinder, a reducing valve adapted to be connected to a source of fluid supply and arranged to limit the pressures that may be applied by the control valves to any predetermined maximum, a by-pass connection between the pressure cylinders and a valve arranged to be operated to open or close said by-pass connection.

15. In a spot welding machine, the combination of a supporting frame having projecting arms between which the plates or structural parts to be welded are adapted to be placed, a pair of fixed electrodes supported upon and insulated from one arm of the frame, a pair of cooperating movable electrodes supported upon and insulated from the other arm of the frame, a pair of welding transformers stationarily mounted in the respective arms of said frame adjacent said pairs of electrodes, said transformers having secondary windings connected to the respective pairs of electrodes, and fluid pressure means arranged to apply pressure independently to the individual electrodes of the movable pair of electrodes.

In witness whereof, I have hereunto set my hand this 27th day of November, 1920.

JAMES M. WEED.